United States Patent
Antraygue

(10) Patent No.: US 11,254,420 B2
(45) Date of Patent: Feb. 22, 2022

(54) ACTUATOR WITH DECLUTCHABLE OUTPUT LEVER

(71) Applicant: Ratier-Figeac SAS, Figeac (FR)

(72) Inventor: Cedric Antraygue, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 122 days.

(21) Appl. No.: 16/702,219

(22) Filed: Dec. 3, 2019

(65) Prior Publication Data

US 2020/0369374 A1 Nov. 26, 2020

(30) Foreign Application Priority Data

May 16, 2019 (EP) .................................. 19290032.2

(51) Int. Cl.
*B64C 13/34* (2006.01)
*B64C 13/50* (2006.01)

(52) U.S. Cl.
CPC .............. *B64C 13/34* (2013.01); *B64C 13/50* (2013.01)

(58) Field of Classification Search
CPC ................................. B64C 13/34; B64C 13/50
See application file for complete search history.

(56) References Cited

U.S. PATENT DOCUMENTS

| | | | |
|---|---|---|---|
| 3,964,318 A | 6/1976 | Shutt | |
| 8,393,442 B2 | 3/2013 | Lang et al. | |
| 9,249,874 B2 | 2/2016 | Ravoux et al. | |
| 10,106,245 B2 | 10/2018 | Wilkens | |
| 2011/0226075 A1* | 9/2011 | Nguyen | B64C 13/50 74/89.38 |
| 2019/0270511 A1* | 9/2019 | Socheleau | B64C 13/50 |

FOREIGN PATENT DOCUMENTS

| | | |
|---|---|---|
| EP | 2033892 A1 | 3/2009 |
| GB | 1466380 A | 3/1977 |
| JP | 2017052453 A | 3/2017 |
| WO | 2011048399 A1 | 4/2011 |
| WO | 2016083801 A1 | 6/2016 |

OTHER PUBLICATIONS

European Search Report for application EP 19290032.2, dated Oct. 16, 2019, 8 pages.

\* cited by examiner

*Primary Examiner* — Rodney A Bonnette
(74) *Attorney, Agent, or Firm* — Cantor Colburn LLP

(57) ABSTRACT

A flight control actuator for actuating an aircraft flight control system is provided. The flight control actuator comprises a gearbox, an output shaft attached to the gearbox and an output lever provided on the output shaft. The output lever is declutchable from the output shaft. The output lever includes an inner diameter through which the output shaft passes and at least one indentation in said inner diameter. The output shaft includes a hollow cylindrical member with at least one hole provided at the axial position of the at least one indentation of the output lever.

14 Claims, 8 Drawing Sheets

ACTUATOR WITH DECLUTCHABLE OUTPUT LEVER

FOREIGN PRIORITY

This application claims priority to European Patent Application No. 19290032.2 filed May 16, 2019, the entire contents of which is incorporated herein by reference.

FIELD

The invention relates to flight control actuators for use in piloting a vehicle such as an aircraft or ship comprising an aerodynamic or hydrodynamic control surface. The flight control actuator can be incorporated into flight control systems; such as helicopter flight control systems.

BACKGROUND OF THE INVENTION

Flight control actuators are typically mounted in parallel with mechanical flight controls and are responsible for creating a "force feel" sensation in the pilot control component and/or a position backdrive of the steering component (for autopilot or trim functions). Flight control actuators typically comprise 2 stages of gears, meaning a large number of bearings are required, which increases the risk of jamming (mechanical seizure/malfunction) in the actuator. In the event the actuator becomes jammed, the flight controls become unusable and the pilot may no longer be able to control the aircraft. It is therefore important to provide means for bypassing the flight control actuator in the mechanical control line, or kinematic chain, between the pilot control component and the steering components of the aircraft, such that the pilot may continue to control the movement of the aircraft in the event of jamming in the flight control actuator.

Generally, the state of the art has attempted to solve this problem by incorporating a mechanical fuse, such as a shear pin, which can be manually broken by the pilot in the case of flight control actuator jam and seizure of flight controls. This solution, however, has serious drawbacks in that the mechanical fuse requires great physical strength to break. This is due to the fuse requiring the strength to withstand normal use, especially high accelerations, which involve significant forces internal to the flight controls. Furthermore, the action of breaking the mechanical fuse can cause substantial involuntary movement of the aircraft, which could be extremely dangerous, especially when the aircraft is close to the ground.

The present invention aims to provide a solution to the problem of actuator jams or malfunctions without some or all of the aforementioned drawbacks associated with a mechanical fuse.

SUMMARY OF THE INVENTION

According to one aspect, a flight control actuator for actuating an aircraft flight control system is provided. The flight control actuator comprises a gearbox, an output shaft attached to the gearbox and an output lever provided on the output shaft. The output lever is declutchable from the output shaft.

According to another aspect, an aircraft flight control system is provided, comprising a steering component, the flight control actuator as described above, and a linkage assembly connected between the flight control actuator and the steering component.

According to another aspect, a method of providing a flight control actuator comprising a gearbox and an output shaft attached to the gearbox, providing an output lever on the output shaft and declutching the output lever from the output shaft is provided.

DETAILED DESCRIPTION

Figure 1:
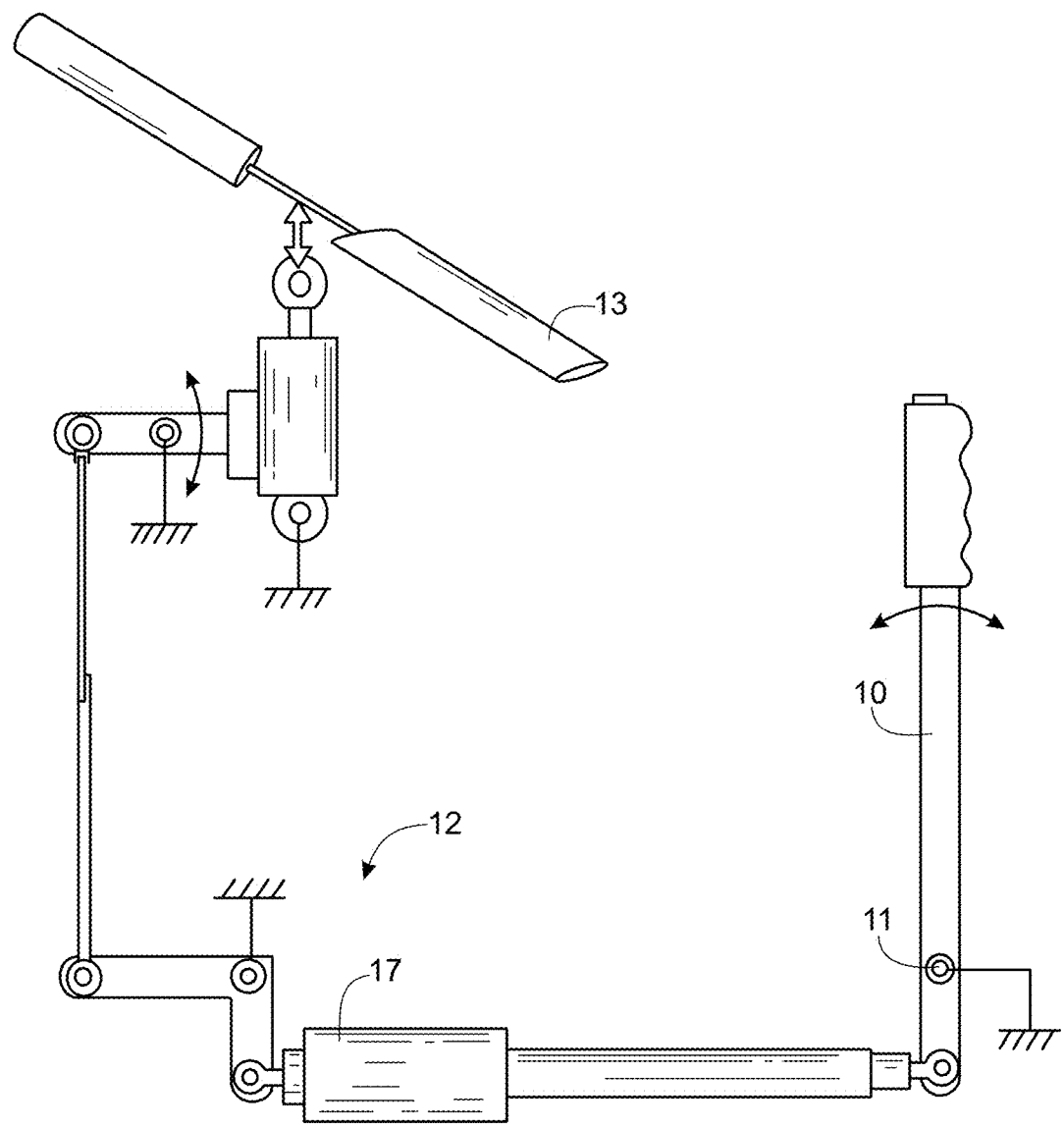
FIG. 1 shows an example of a known flight control system including a piloting component 10, a steering component 13 and a linkage 12.

FIG. 1 shows an example of part of a flight control system. Piloting component 10 is depicted in the form of a handle articulated about a horizontal pivot point 11 but could be in any other form, such as a plurality of handles, one or more peddles, one or more rudder bars, one or more pull-handles etc. The piloting component 10 is connected to a steering component 13 (which, in the present case is depicted as an aerodynamic control surface of an aircraft, but could be any other type of steering component for any vehicle) by a linkage 12 of a kinematic chain. The piloting component may be connected, by one or more branches 12 of kinematic chain, to one or more steering components. Each branch 12 of the kinematic chain, or "linkage", comprises a series of mechanical components and connections and links the piloting component 10 to each respective steering component 13.

Each linkage 12 of the kinematic chain is configured to mechanically transmit movements imparted onto the piloting component 10 by a pilot to the respective steering component 13. The linkages 12 of a kinematic chain in an aircraft system can be very long and heavy, depending on the particular dimensions and construction of the aircraft, and the particular steering component 13. Therefore, constituent members of the linkages 12 can give rise to high friction forces, especially when the linkages 12 are of great length. Under these conditions, the pilot may have great difficulty in moving the piloting component 10 in certain directions, to provide certain steering commands to the aircraft steering components 13 via the linkages 12.

Figure 2:
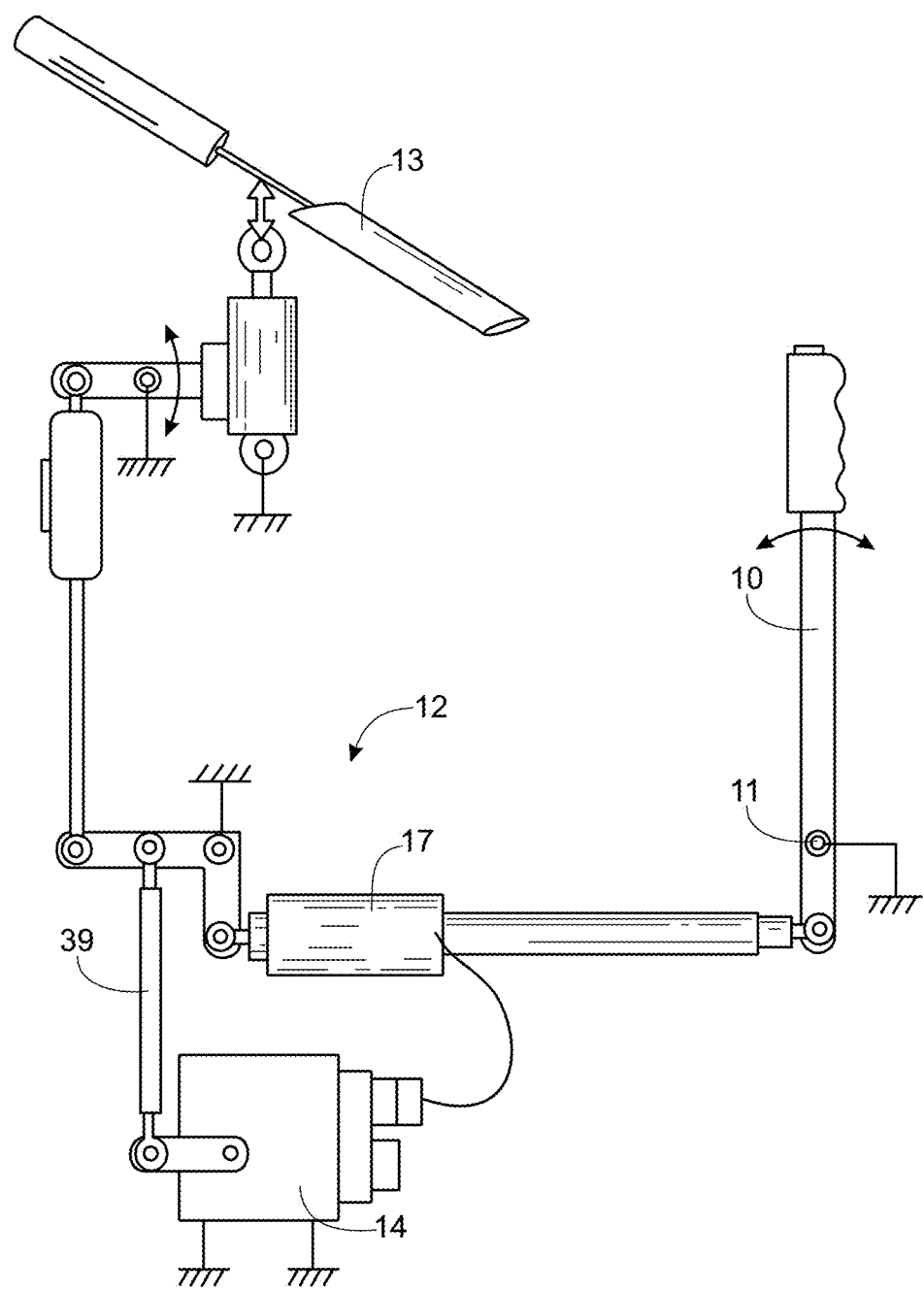
FIG. 2 shows an example of a flight control system as in FIG. 1 but further comprising a flight control actuator 14.

To overcome these issues, a parallel or "flight control" actuator can be connected to the linkage, usually along with a serial actuator 15, connected in series. FIG. 2 shows an example of a flight control system with a flight control actuator 14 connected in parallel with the linkage. The flight control actuator 14 is connected in parallel to the linkage and can be controlled by autopilot means. The flight control actuator makes it possible to eliminate the need to use a damper of the piloting component. The flight control actuator 14 is capable of being subjected to numerous adjusting and regulating operations, has a high sensitivity and can have an easily estimable long service life. The flight control actuator 14 is controlled electronically via feedback from one or more force sensors 17 on the linkage 12 and can therefore be controlled via autopilot means in order to stabilise the aircraft and can mechanically transmit commands and forces from the piloting component 10 to each steering component 13 through respective linkages. The actuator provides a "force feel" to the pilot and can be used to make the force required to move the piloting component isotropic, to compensate for differences in frictional forces in different linkages, connecting various steering components.

Figure 3:
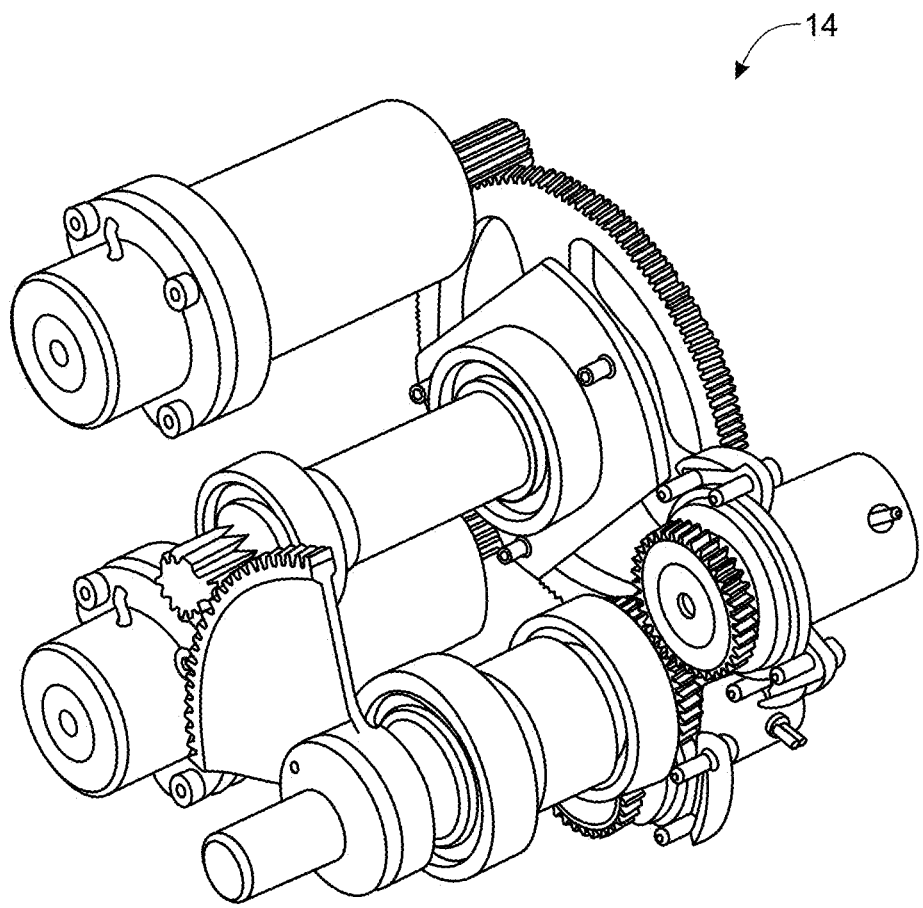
FIG. 3 shows an example gearbox of a flight control actuator.

FIG. 3 shows an example of the gearbox of a flight control actuator 14. This gearbox includes spur gears, however, epicycloidal gears may also be used. In either case, two stages of gears are necessary.

One of the problems associated with such flight control actuators is that, due to the gearbox comprising two stages of gears, many bearings are required therein. The large number of bearings required creates an increased probability/risk of jamming (mechanical seizure of moving gear parts) of the gears during operation. This presents a serious problem because, due to the nature of the connection between the linkage and the flight control actuator, if the flight control actuator becomes jammed, the entire linkage will become jammed. This means that the pilot will no longer be able to use the piloting component to control the steering components, and as a result, all flight control is lost. Without means to remedy or bypass the jam in the flight control actuator, the aircraft flight controls will cease to function.

Presently, when a jam is detected by a pilot, or the pilot is alerted to a jam in the gearbox, the pilot needs to use emergency measures to bypass the flight control actuator. This is achieved by forcefully breaking a 'mechanical fuse' that enables the flight controls to be used without the flight control actuator.

Figure 4A:
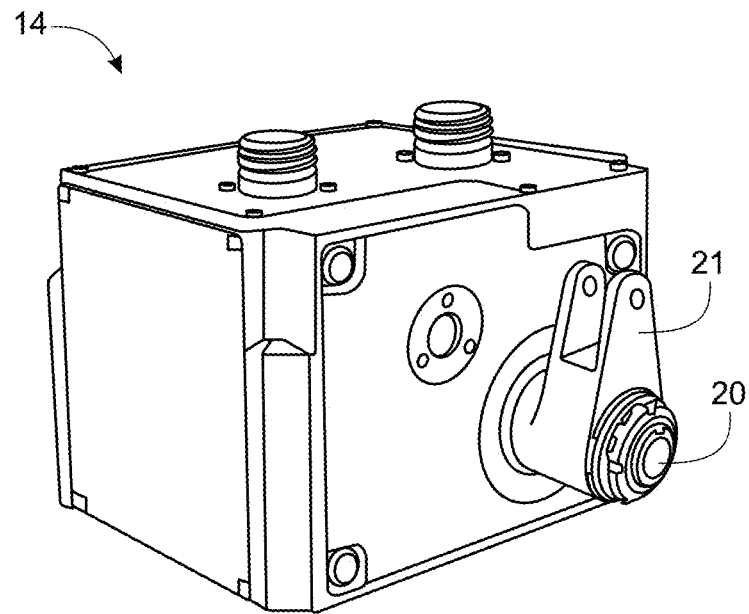
FIG. 4a shows an example of a flight control actuator within a housing.
Figure 4B:
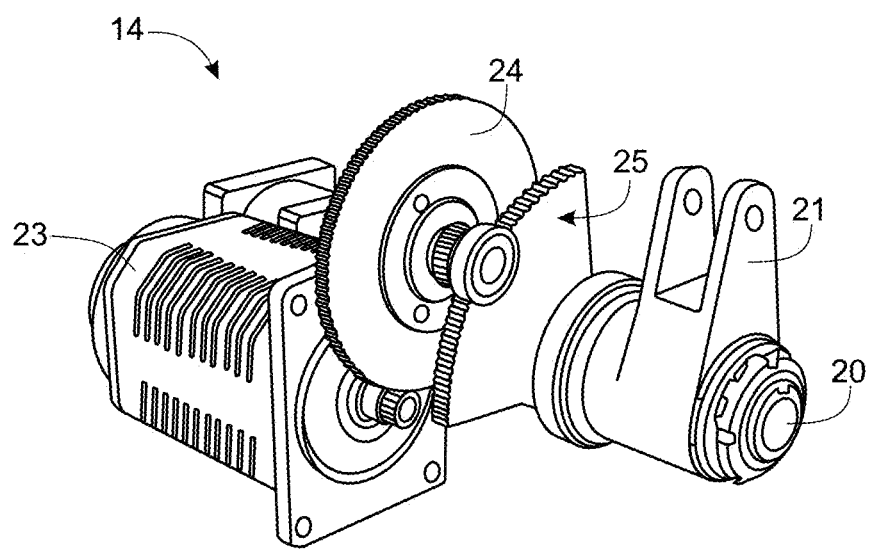
FIG. 4b shows an example of a flight control actuator with the housing removed.

Therefore, according to one example of the invention, a flight control actuator with a declutchable output lever is provided. FIGS. 4a and 4b illustrate an example of a flight control actuator 14, according to the invention. Flight control actuator 14 comprises a motor 23, an intermediate gear 24, and a sector gear 25. The intermediate gear 24 is driven by the motor 23 and the sector gear 25 is driven by the intermediate gear 24. The sector gear 25 is fixed stationary relative to an output shaft 20, which is in turn connected to an output lever 21. The output lever 21 connects to the linkage 12 by a rigid member 39. The flight control actuator 14 is configured such that when the motor 23 is powered (by autopilot commands or by manual, pilot commands), the sector gear 25 is driven, which in turn rotates the output shaft 20, and output lever 21, to provide force along the linkage 12 to the steering component 13. For this operation to function, the output lever 21 is fixed in rotation to the output shaft 20, such that when the output shaft 20 rotates by an angle, the output lever 21 also rotates by said angle.

Figure 5A:
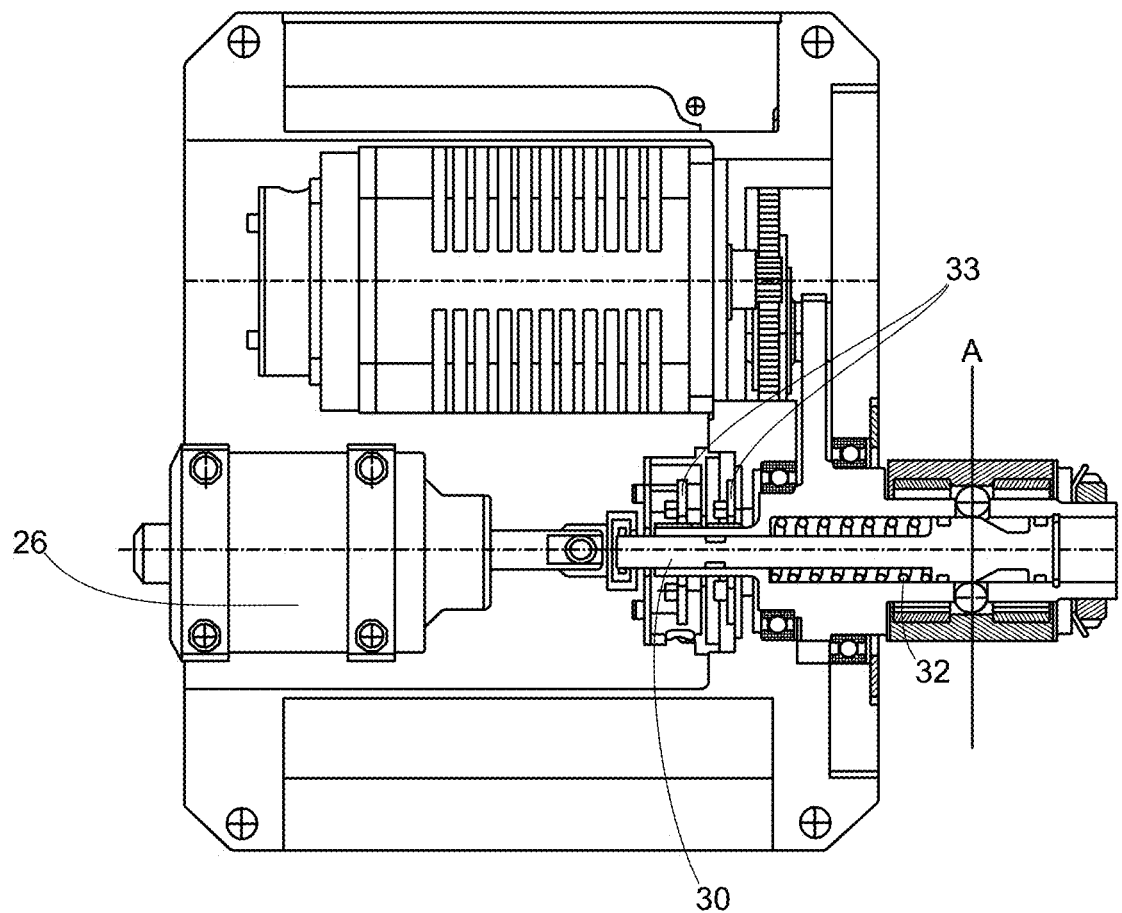
FIG. 5a shows an example of a flight control actuator with a declutching mechanism in a first position.
Figure 5B:
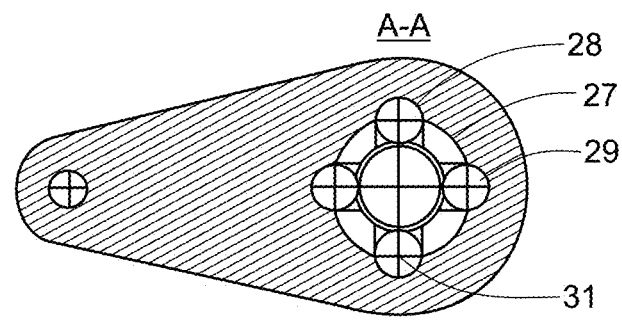
FIG. 5b shows an example of an output lever of a flight control actuator with a part of the declutching mechanism, also in a first position.

FIG. 5a depicts a cross-section of the flight control actuator 14. As can be seen, flight control actuator 14 may also include a solenoid 26. FIG. 5b shows a cross section of the output lever 21 and output shaft 20 at the point of attachment therebetween. The cylindrical inner surface 27 of the output lever 21, through which the output shaft 20 passes, comprises one or more indentations 28, or notches, in its circumference. The output shaft 20 in this region consists of a hollow cylindrical member. In the axial region proximate the output lever 21, the output shaft 20 comprises one or more holes 29 arranged circumferentially at one axial position of the output shaft 20. A plunger 30 is disposed within the output shaft. The plunger 30 is substantially cylindrical in the axial region proximate the output lever 21 but tapers in diameter in an axial direction away from the actuator 14 so as to form a frustoconical section. As can be seen in FIG. 5a, the diameter of the plunger 30 at an axial position A is substantially equal to the inner diameter of the output shaft 20. In order to provide that the output lever 21 is rotationally stationary with respect to the output shaft 20, one or more balls 31 are placed at the circumferential positions of the one or more indentations 28 in the inner surface 27 of the output lever 21. The balls 31 are also situated in the holes 29 provided in the output shaft 20. The radii of the one or more balls 31 are substantially equal to the depth of the indentations 28 in the inner surface 27 of the output lever 21. Furthermore, the radii of the one or more balls 31 are substantially equal to the wall thickness of the hollow cylindrical output shaft 20. This means that, when the balls 31 are placed in each indentation 28, and each hole 29, the output shaft 20 cannot move rotationally with respect to the output lever 21. The balls 31 cannot escape from the indentations 28 due to the diameter of the plunger 30 in this position A. In position A, the plunger 30 is in contact with the balls 31 on the side opposite the indentations 28.

As can be seen from FIG. 5a, the plunger 30 in the region near the output lever is tapered, such that the diameter thereof decreases in an axial direction away from the actuator. The output shaft is axially moveable between position A and position B and is biased into the position shown in FIG. 5a (position A) by preloaded spring 32. This position provides a 'clutched' position so that the flight control actuator 14 provides forces to the flight controls.

Figure 6A:
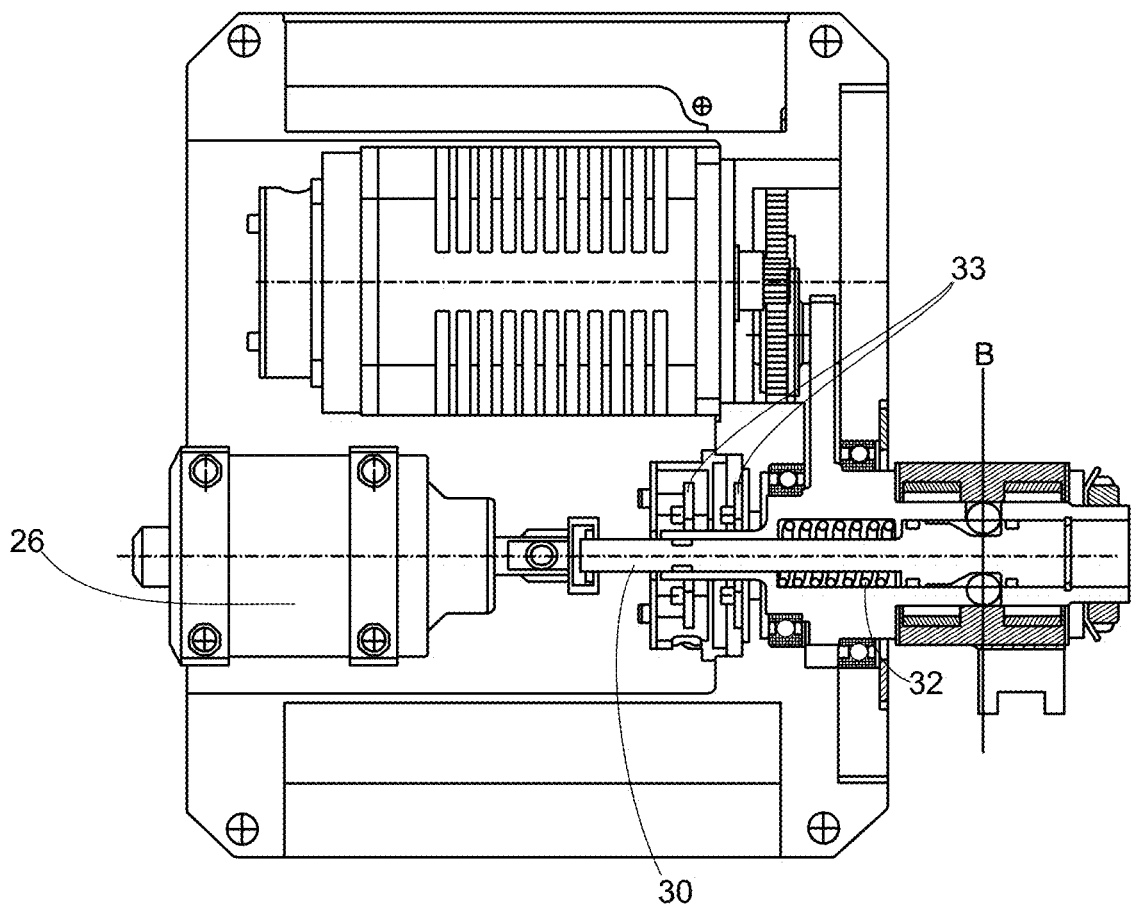
FIG. 6a shows an example of a flight control actuator with a declutching mechanism in a second position.
Figure 6B:
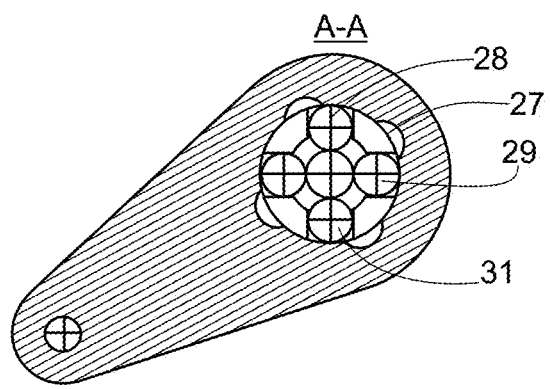
FIG. 6b shows an example of an output lever of a flight control actuator with a part of the declutching mechanism, also in a second position.

FIG. 6a shows the same arrangement as in FIG. 5a. However, FIG. 6a demonstrates the configuration achieved when solenoid 26 is powered. Powering of the solenoid 26 creates an attractive force between the solenoid 26 and the end of the plunger 30 proximate the solenoid 26 and opposite to the output lever 21. The attractive force provided by the solenoid 26 causes the preloaded spring 32 to be compressed and the plunger 30 to move axially towards the solenoid 26, into position B. As can be seen in FIGS. 6a and 6b, in position B, the section of the plunger 30 in the same axial position as the holes in the output shaft 20 and the indentations 28 of the output lever 21 has a smaller diameter. This means that the balls 31 are free to move radially inwards, out from the indentations 28 in the output lever 21 whilst staying in contact with the outer surface of the plunger 30. As can be seen from FIG. 6b, this means that the output lever 21 is no longer rotationally fixed with respect to the output shaft 20. This is the "declutched" state of the actuator. Under these conditions, if the actuator has jammed, the output lever 21 will be freely rotatable with respect to the output shaft 20 and flight control actuator 14. This means that the linkage 12, and thus flight controls, will no longer be jammed. The pilot will be able to control the steering components 13 through the linkages 12, albeit without "force feel" or assistance provided by the flight control actuator 14.

Subsequent switching off of the solenoid 26 will, due to the preloaded spring 32, move the plunger 30 axially outwards from the actuator 14, away from the solenoid 26. In this case, the plunger 30 will return to position A, the balls 31 will move back into the indentations 28 in the inner surface 27 of the output lever 21 and the output shaft 20 will once more be rotationally fixed with respect to the output lever 21. This means that the flight control actuator 14 can be re-clutched subsequent to declutching.

It is envisaged that the solenoid 26 and plunger 30 arrangement could operate in the opposite way, i.e., that when the solenoid 26 is powered, the plunger 30 is biased into position A, and that when power is cut from the solenoid 26, the plunger 30 will move to position B. This could be embodied by providing a plunger 30 like the one in FIGS. 5a and 6a but whose diameter decreases in a direction towards the flight control actuator 14/solenoid 26, rather than away from the flight control actuator 14/solenoid 26.

One of the advantages in providing an electrically commanded declutching operation is that the flight control actuator 14 can be declutched automatically in response to, for example, automatic detection of jamming. This means that it is not necessary for the pilot to recognise a jam in the actuator 14 and then manually command the declutching of the flight control actuator 14. Instead, the declutching can occur automatically, and therefore much more quickly, reducing the time in which the aircraft is uncontrollable and therefore increasing the safety of the aircraft. It is envisaged, however, that the declutching can be commanded manually by the pilot as well as automatically in response to certain detected conditions.

As compared with pre-existing mechanical fuse systems, the flight control actuator 14 can be declutched, or disconnected from the flight controls without substantial effort/strength on behalf of the pilot, which may not always be sufficient. Furthermore, the flight control actuator 14 can be declutched without any unwanted involuntary movement, or "transient", associated with breaking a mechanical fuse.

According to an example of the present invention, FIG. 5a shows the flight control actuator 14 and output shaft 20, with the plunger in position A. The flight control actuator 14 of FIG. 5a includes one set of position sensors 33. These position sensors 33 are disposed on the output shaft 20.

Figure 7A:
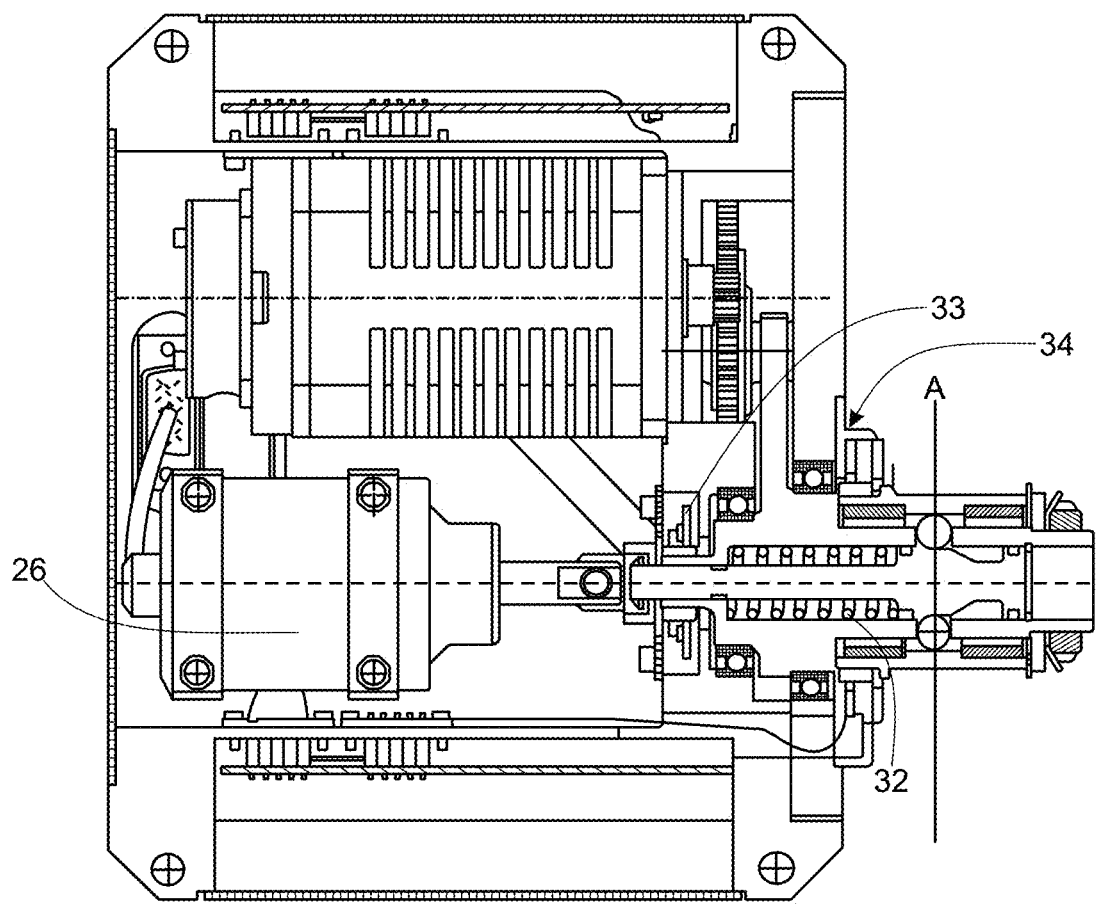
FIG. 7a shows an example of a flight control actuator with a declutching mechanism in a first position and comprising sensors on the output lever.
Figure 7B:
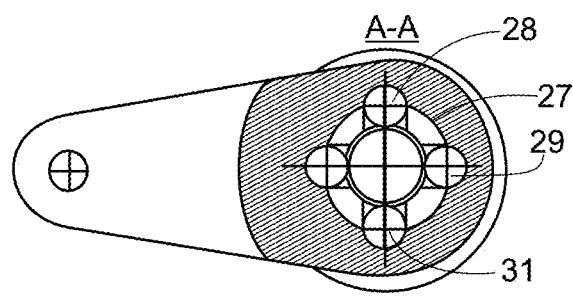
FIG. 7b shows an example of an output lever of a flight control actuator with a part of the declutching mechanism in a first position.
Figure 8A:
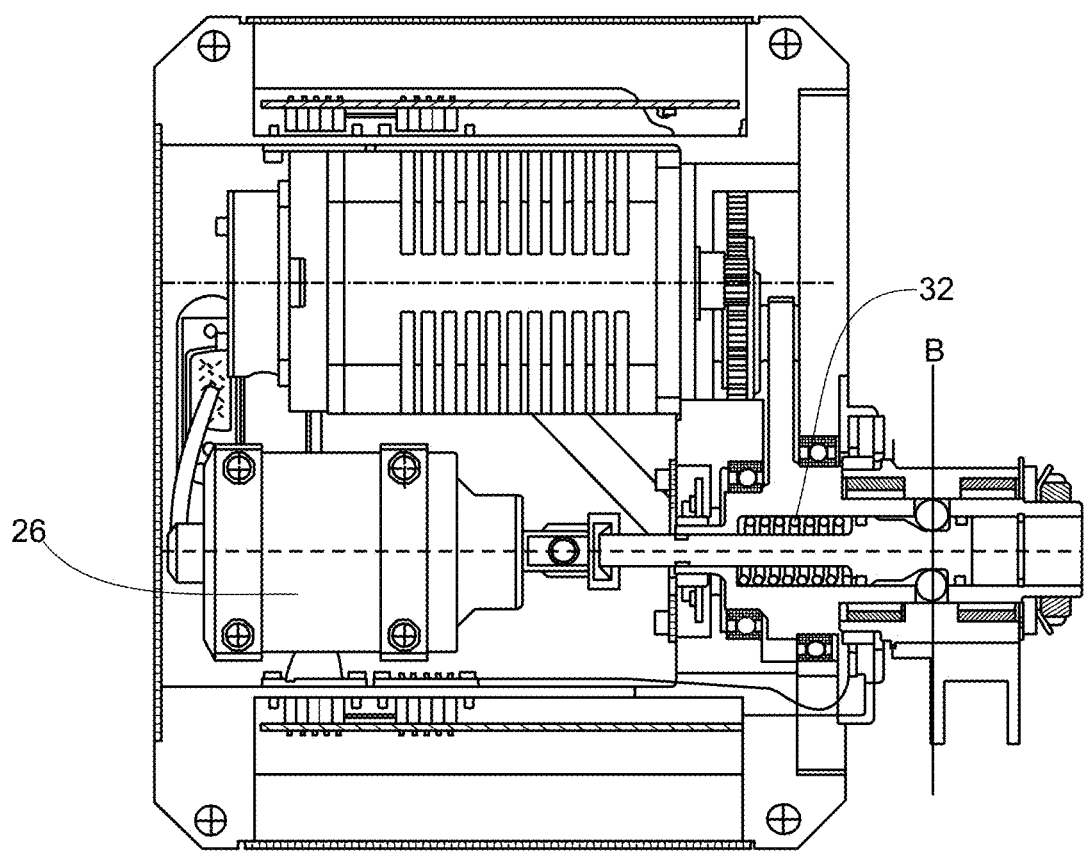
FIG. 8a shows an example of a flight control actuator with a declutching mechanism in a second position and comprising sensors on the output lever.
Figure 8B:
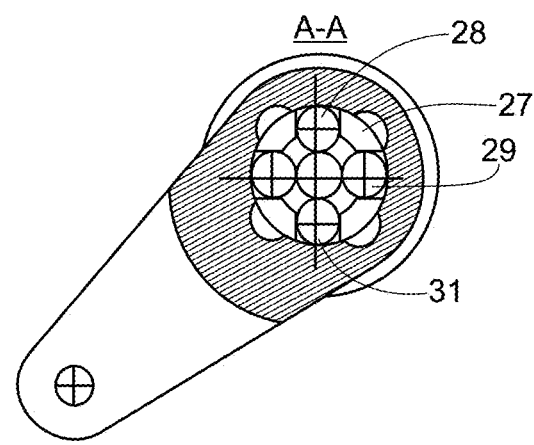
FIG. 8b shows an example of an output lever of a flight control actuator with a part of the declutching mechanism in a second position.

According to another example of the present invention, as shown in FIGS. 7a and 8a, the flight control actuator 14 comprises two sets of position sensors (33, 34). FIGS. 7a and 8a are equivalent to FIGS. 5a and 6a respectively but with a second set of position sensors 34 provided. In this embodiment, one set of position sensors 33 is provided on the output shaft 20, and another set of position sensors 34 is provided on the output lever 21. This embodiment provides that, when the flight control actuator 14 is declutched, the set of position sensors 34 on the output lever 21 will continue to be useful for flight controls or thrust application. With only one set of sensors 33 placed on the output shaft 20, as in FIGS. 5a and 6a, this would not be possible, since, after declutching, the output shaft 20 would no longer rotate in accordance with the output lever 21 and flight controls.

A further advantage of the example of FIGS. 7a and 8a is that an erroneous declutch can be detected. For example, if the flight control system declutches the flight control actuator 14 to bypass a jam in the flight control actuator 14, but the flight control actuator 14 is, in reality, still functioning correctly and is not jammed. In this scenario, the pilot unnecessarily loses the advantages of the flight control actuator 14 but without knowing that the flight control actuator 14 is, in fact, uncompromised and capable of being utilised. By measuring the consistency between the readings of the first set of position sensors 33 disposed on the output shaft and the second set of sensors 34 disposed on the output lever 31, the system can deduce whether the flight control actuator 14 is still operative. For example, if the position sensors 33 on the output shaft 20 indicate that the output shaft 20 is still moving, and that the output lever 21 is also moving but in a different direction or velocity, this would indicate that the flight control actuator 14 has been declutched unnecessarily. The position sensors of the flight control actuator may be magnetic position sensors, made from a rotor and a stator. The rotor is made of a plurality of magnets (diametrically magnetised) and the stator is made of an integrated circuit which senses the direction of the magnetic field created by the magnets.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

What is claimed is:

1. A flight control actuator for actuating an aircraft flight control system, the flight control actuator comprising:
    a gearbox;
    an output shaft attached to the gearbox; and
    an output lever provided on the output shaft, wherein the output lever is declutchable from the output shaft;
    wherein:
    the output lever comprises an inner diameter through which the output shaft passes, wherein there is provided at least one indentation in said inner diameter;
    wherein the output shaft comprises a hollow cylindrical member with at least one hole provided at the axial position of the at least one indentation of the output lever;
    said flight control actuator further comprising:
    a plunger positioned in a first axial position within the output shaft;
    wherein one or more balls are positioned in each of said at least one hole of the output shaft and between the plunger and the at least one indentation of the output lever, such that the output lever and output shaft are rotatably coupled and the flight control actuator is clutched.

2. The flight control actuator of claim 1, wherein:
    the plunger is tapered in diameter such that, when moved axially with respect to the output shaft into a second axial position, the one or more balls fall out of the at least one indentation in the output lever such that the output lever and output shaft are decoupled and the flight control actuator is declutched.

3. The flight control actuator of claim 2, further comprising:
    a biasing member which biases the plunger into said first axial position.

4. The flight control actuator of claim 3, wherein:
the plunger can be moved axially into said second axial position to decouple the output shaft from the output lever using an electrical actuator, preferably wherein the electrical actuator is a solenoid.

5. The flight control actuator of claim 4, wherein;
said biasing member exerts a force on the plunger opposite to the force applied by the solenoid such that the plunger moves axially to recouple the output lever and output shaft when the electrical actuator is depowered.

6. The flight control actuator of claim 1, further comprising:
a first set of position sensors disposed on the output shaft.

7. The flight control actuator of claim 6, further comprising:
a second set of position sensors provided on the output lever.

8. The flight control actuator of claim 7, wherein;
said electronic means is configured to detect an erroneous declutch by comparing readings from the first set of position sensors and the second set of position sensors.

9. The flight control actuator of claim 8, wherein;
said electronic means is configured to automatically re-clutch the flight control actuator upon detection of an erroneous declutch.

10. The flight control actuator of claim 1, further comprising:
electronic means to automatically detect a jam within the flight control actuator.

11. The flight control actuator of claim 10, wherein;
said electronic means is configured to automatically declutch the flight control actuator in response to a detection of a jam within said flight control actuator (14).

12. An aircraft flight control system comprising:
a steering component;
the flight control actuator as claimed in claim 1; and
a linkage assembly connected between the flight control actuator and the steering component.

13. A method comprising:
providing a flight control actuator comprising a gearbox and an output shaft attached to the gearbox;
providing an output lever on the output shaft, wherein: the output lever comprises an inner diameter through which the output shaft passes, wherein there is provided at least one indentation in said inner diameter; wherein the output shaft comprises a hollow cylindrical member with at least one hole provided at the axial position of the at least one indentation of the output lever;
said flight control actuator further comprising:
a plunger positioned in a first axial position within the output shaft;
wherein one or more balls are positioned in each of said at least one hole of the output shaft and between the plunger and the at least one indentation of the output lever, such that the output lever and output shaft are rotatably coupled and the flight control actuator is clutched; and
declutching the output lever from the output shaft.

14. The method of claim 13, wherein:
the declutching of the output lever from the output shaft is performed automatically, in response to detection of a jam in the flight control actuator.

* * * * *